March 17, 1959  R. E. COASH ET AL  2,877,906
LOAD WEIGHING DEVICE
Filed Feb. 8, 1954  3 Sheets-Sheet 1

INVENTORS.
ROBERT E. COASH
ALONZO B. KENDALL
BY J. Frederick Bechtel
ATTY.

March 17, 1959

R. E. COASH ET AL 2,877,906

LOAD WEIGHING DEVICE

Filed Feb. 8, 1954

INVENTORS.
ROBERT E. COASH
ALONZO B. KENDALL
BY
J. Frederick Bechtel
ATTY.

United States Patent Office 2,877,906
Patented Mar. 17, 1959

2,877,906

LOAD WEIGHING DEVICE

Robert E. Coash, Kalamazoo, and Alonzo B. Kendall, Galesburg, Mich., assignors to Clark Equipment Company, a corporation of Michigan Application February 8, 1954, Serial No. 408,836

5 Claims. (Cl. 214—2)

Our present invention relates generally to load weighing devices, and, more particularly, to load weighing devices for use with industrial fork lift trucks.

In the handling of material, it becomes necessary in many instances to know the weight of a specified allotment of the material as it is being loaded into railroad cars, trucks, and the like so that the latter are not improperly overloaded. Conventionally, when railroad cars, trucks, and the like are being loaded by industrial fork lift trucks, the loads being transported thereby are placed upon a scale and weighed before being deposited in the car or truck. This step of weighing is, of course, time consuming because the truck must be aligned relative to the scale and the load must be lowered to the scale and then raised therefrom.

It is an object of our present invention to provide a mechanism which may be incorporated in a conventional fork lift truck for automatically registering the weight of a load being carried by the load supporting means of the truck.

It is a further object of our present invention to provide load weighing mechanism which will accurately indicate the weight of an engaged load by measuring the force exerted by the load at each side of the load supporting means and recording the sum of such forces.

The above objects are accomplished by providing parallelogram link means between the load supporting carriage and the forks for resolving the vertical force component of a load carried by the forks into a horizontally directed force which is substantially invariable for a given load irrespective of the location of the load on the forks. We further provide a weight-indicating gage having a pair of pressure receiving elements arranged to additively register the pressures exerted therein. A pair of fluid pressurizing means are arranged one at each side of the carriage and respectively have individual connection with the pressure receiving elements of the gage. Lever means are pivotally mounted at the sides of the carriage so as to operatively connect the forks with the fluid pressurizing means for the purpose of generating a fluid pressure in the pressurizing means which is proportional to the load carried by the forks. By measuring such resolved horizontally directed forces exerted by the load at each side of the load supporting carriage individually and then employing a gage for additively registering these forces, we provide a load weighing device wherein the accuracy is not affected by the position of the load on the load supporting means.

Now, in order to acquaint those skilled in the art with the manner of constructing and using load weighing devices in accordance with the principles of our present invention, we shall describe in connection with the accompanying drawings a preferred embodiment of our invention.

Figure 1:
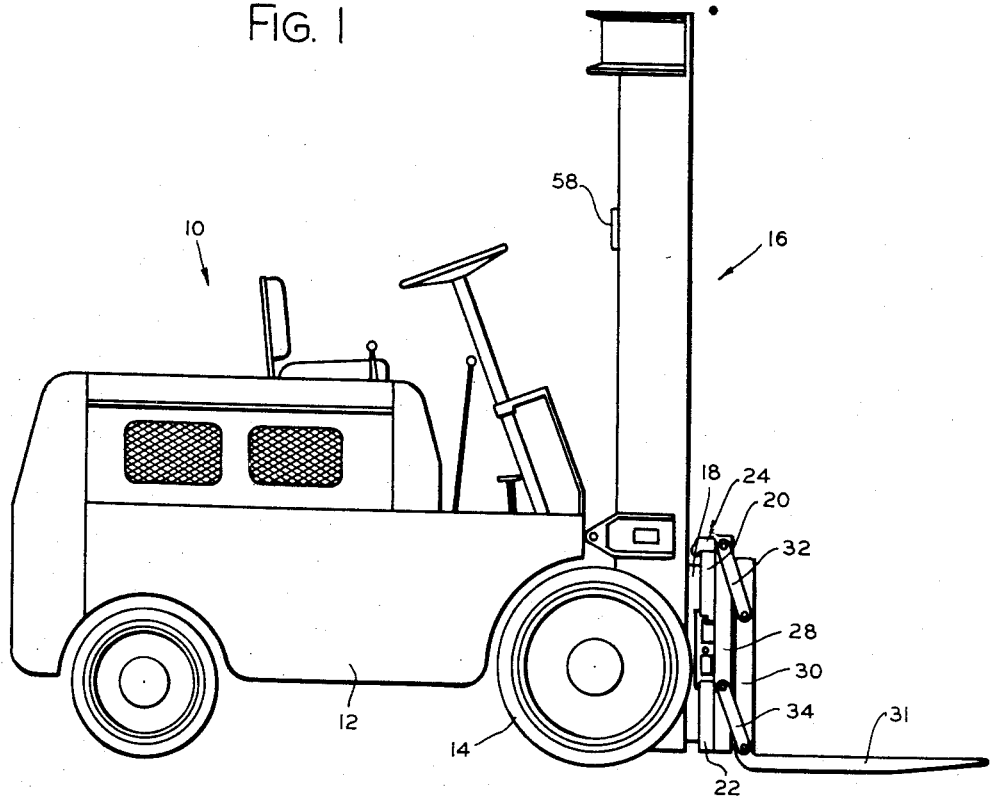
Figure 1 is a side elevational view of an industrial truck with the load weighing mechanism of our present invention embodied thereon.

Referring now to the drawings, there is indicated generally by the reference numeral 10 an industrial truck which comprises a main frame 12 supported at its forward end on drive wheels 14. The main frame 12, at its forward end, carries a generally vertically extending mast construction indicated generally by the reference numeral 16. Mounted for movement within the mast 16 is a load supporting carriage 18 including a pair of vertically spaced transversely extending plate members 20 and 22. Mounted to the upper plate member 20 by means of bracket members 24 and 26 are vertical supporting members 28 which form part of the load supporting carriage.

We shall now describe the load weighing mechanism of our present invention which is associated with, and supported by, the aforedescribed load supporting carriage assembly means. Arranged in alignment with the vertical supporting members 28 are the vertical leg portions of L-shaped fork frames 30 which comprise the load supporting means of our present invention. Although only one of the fork frames appears in the drawing it will be understood that there are two of these fork frames in the form of the invention illustrated, one adjacent each side of the truck, and that each of them has associated therewith the parts described below. The fork frames 30 include horizontal leg portions 31 which project forwardly from the truck. Pairs of link members 32 are pivotally mounted, at their upper ends, to the upper ends of the vertical support members 28, and, at their lower ends, are pivotally mounted to the vertical leg portions of the L-shaped fork frames 30 closely adjacent the upper ends thereof. Additional pairs of link members 34 are pivotally mounted, at their upper ends, to the vertical support members 28 adjacent the lower end thereof, and, at their lower ends, are pivotally mounted to the lower ends of the vertical leg portions of the fork frames 30. By virtue of the employment of the link members 32 and 34 it will be readily apparent to those skilled in the art that the vertical leg portions of the fork frames 30 are maintained parallel at all times to the vertical supporting members 28, irrespective of whether the fork frames 30 move relative to the carriage 18.

A central elongated opening 36 is formed in the central portion of each vertical supporting member 28, and pivotally mounted within each opening 36 about a horizontal shaft 38 is a lever 40. Follower members 42 are secured in the vertical leg portions of the fork frames 30 and bear against the adjacent levers 40 below the shafts 38.

Figure 2:
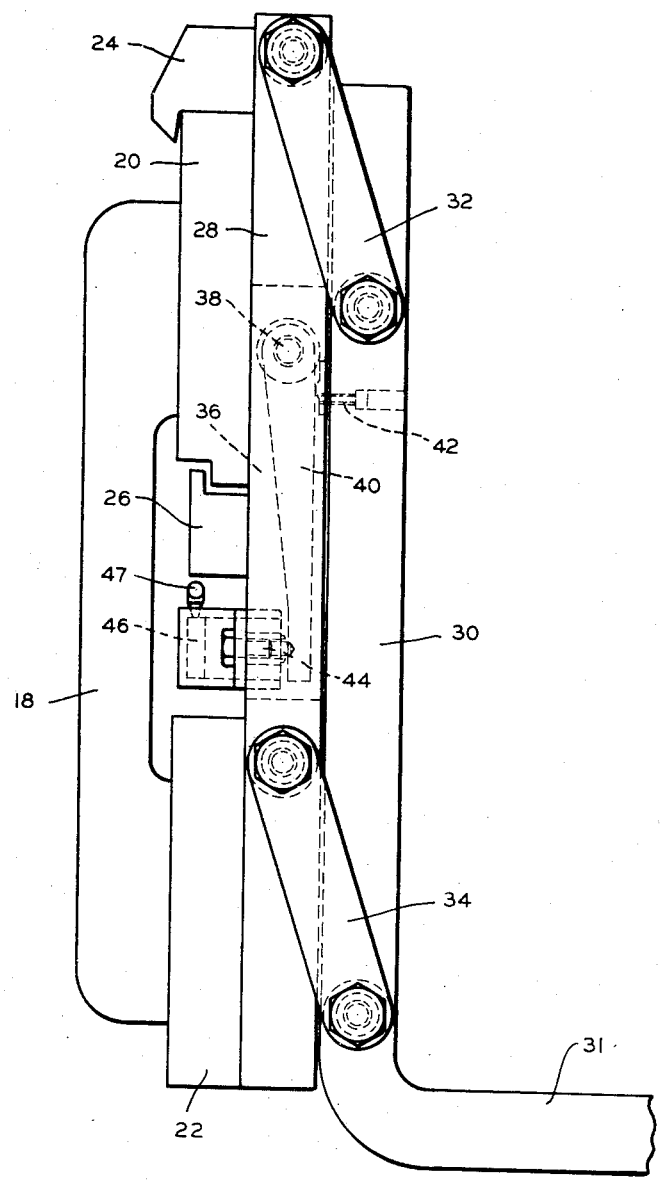
Figure 2 is an enlarged side elevational view of the load weighing mechanism of Figure 1.

The parallelogram type mounting of the fork frames 30 to the load supporting carriage 18, through the employment of the link members 32 and 34, serves to translate the vertical downward force of the weight of a load supported on the fork frames 30 into horizontal forces which through the followers 42 tend to pivot the lever members 40 in a clockwise direction as viewed in Figure 2. The force exerted by each follower 42 on the adjacent lever member 40 will be proportional to the force exerted by the load on the load supporting fork 30 at the respective side of the truck, irrespective of the longitudinal location of the load relative to the forks and irrespective of the size, shape and/or uniformity or lack thereof of the load.

The lower ends of the lever members 40 bear against piston members 44 which are slidably mounted in horizontal fluid cylinders 46. The pistons 44 and cylinders 46 define fluid pressurizing means which have connection through fluid conducting hoses 47 with a fluid pressure operated weight-indicating gage 58 shown in Figure 1 mounted in a convenient location on the truck.

Figure 4:
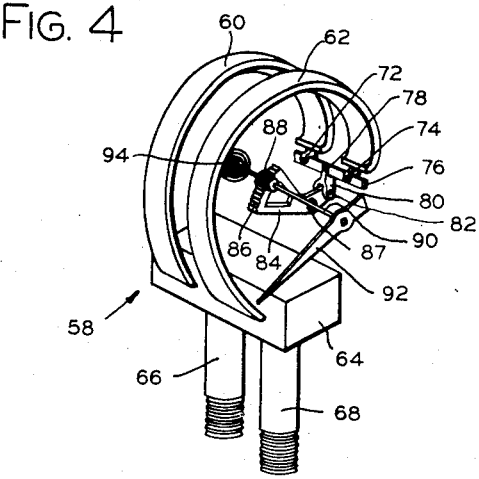
Figure 4 is a partial perspective view of the elements of the weight-indicating gage employed in our present invention.

The weight-indicating gage 58 is shown with the cover and hose connections removed in Fig. 4 and comprises a pair of curved pressure receiving elements or Bourdon spring tubes 60 and 62 which are secured at their one ends in a ported block 64 from which extend gage connecting pipes 66 and 68. The pipes 66 and 68 are respectively individually connected through the fluid conducting hoses 47 with the fluid compressing piston and cylinder assemblies 44, 46. The Bourdon tubes 60 and 62, as will be understood by those skilled in the art, due to their spring qualities, will tend to straighten out when internal pressure is applied. This straightening movement is resisted by the rigidity of the metal Bourdon tubes.

The ends of the Bourdon tubes 60 and 62 which are opposite to the ends fixed in the block 64 are pivotally connected at 72 and 74 to a transverse walking beam member 76. The intermediate portion of the walking beam 76 is pivotally mounted at 78 to a clevis member 80. The clevis member 80, in turn, is pivotally mounted at 82 to the one end of a bell crank 84 which is pivotally mounted on an axis 87. The end of the bell crank 84 opposite the mounting 82 is formed with rack teeth 86 which engage the teeth of a pinion 88. The pinion 88 is secured to a needle shaft 90 which, at one end, supports a pointer 92 adapted to move along a scale graduated in pounds. The other end of the needle shaft 90 is secured to the one end of a spiral spring 94 which serves to normally return the pointer 92 to a zero position when the internal pressure is removed from the Bourdon tubes 60 and 62. The scale of the gage is calibrated so as to indicate the sum of the pressures of the fluids in both of the Bourdon tubes 60 and 62. These pressures, which are proportional to the weight of the load on the load supporting means, are additively indicated on the gage scale, due to the connection of both of the Bourdon tubes 60 and 62 to the common pointer 92 through the means of the walking beam 76.

Figure 3:
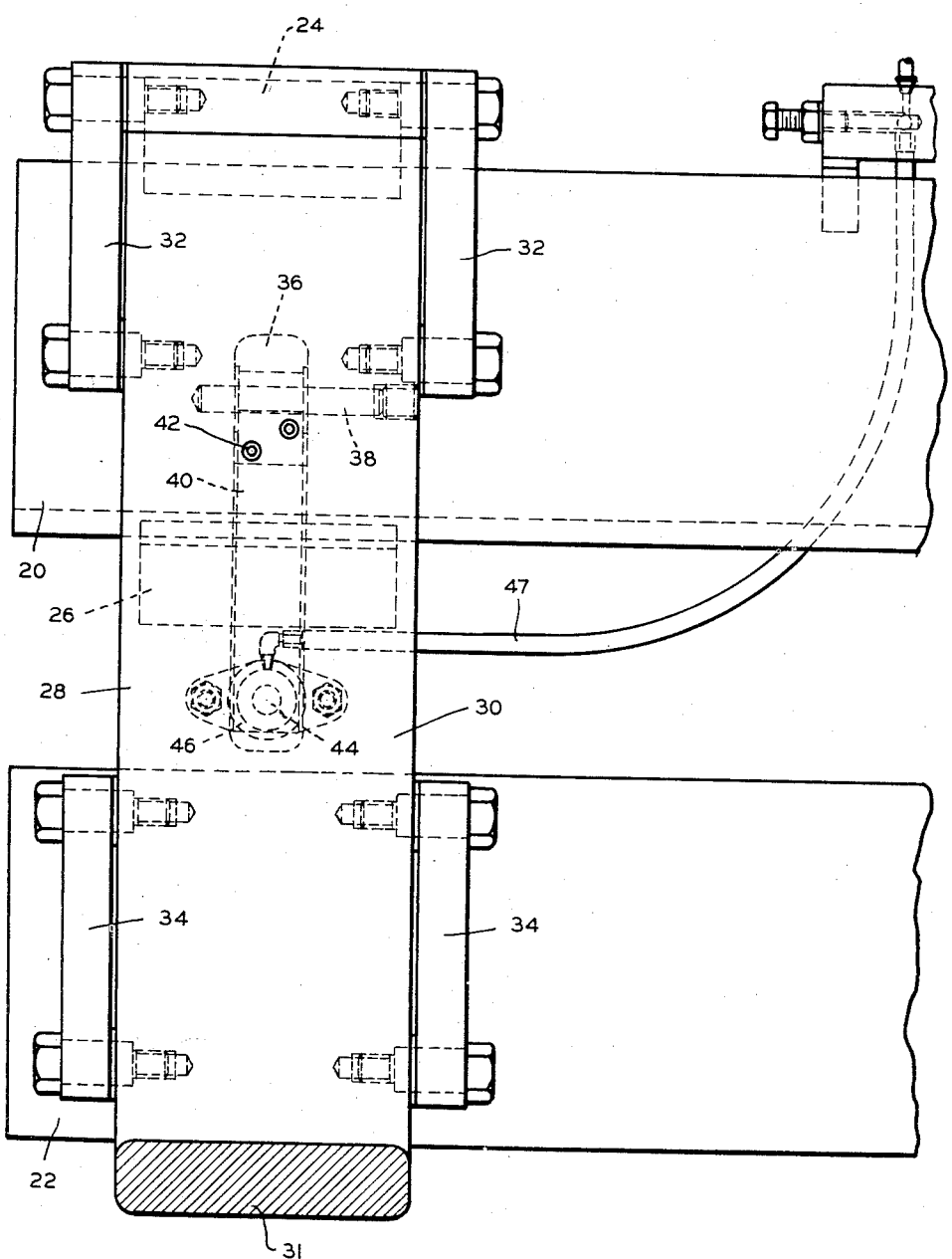
Figure 3 is an enlarged partial front elevational view of the load weighing mechanism of Figure 1.

For example, if a weight of 100 pounds is applied to the left fork frame 30 as viewed in Figure 3, the fork frame 30 will tend to move downwardly relative to the load supporting carriage as the latter is raised within the truck mast 16, and the parallelogram linkage means will thereupon function to resolve the downward force of the weight into a proportional horizontal force which will be applied by the follower 42 on the adjacent lever 40. The lever 40 will tend to pivot in a clockwise direction and will apply a proportional horizontal force to the piston 44 thereby pressurizing the fluid in the cylinder 46. This pressure is transmitted to the Bourdon tube 60 through the interconnecting hose 47. As the tube 60 tends to straighten out, the pivot point 72 will move upwardly from the position shown in Figure 4 with the pivot point 74 serving as a fulcrum. Simultaneously, the pivot point 78 will move upwardly half the distance that the pivot point 72 moves. Such upward movement of the pivot point 78 will cause movement of the yoke member 80 and the bell crank 84 causing the rack 86 to rotate the pinion 88 and the pointer 92 in a clockwise direction as viewed in Figure 4 thereby indicating the weight which lies on the left fork frame 30.

Now should a 100-pound weight be applied to the right fork frame 30, the piston 44 of the fluid pressurizing means at the right side of the truck will be energized in the same manner as the piston 44 of the fluid pressurizing means at the left side of the truck described hereinbefore, thereby causing pressure to be exerted in the Bourdon tube 62 and causing upward movement of the pivot point 74 as viewed in Figure 4 with the pivot point 72 serving as a fulcrum. Correspondingly, the pivot point 78 of the walking beam 76 will be moved up half the distance that the pivot point 74 is moved and the bell crank 84 will be actuated for rotating the pinion 88 and pointer 92 further in a clockwise direction. The Bourdon tubes 60 and 62 can act non-uniformly on the pointer 92 either separately or simultaneously. Consequently, the gage accurately records the weight of a load irrespective of the distribution of the load on the load supporting means.

It will be understood that in practice a certain amount of parallel motion of fork frames 30 relative to carriage 18 may occur when the forks engage a load, despite the use of an incompressible fluid in a closed hydraulic system, due to such factors as flexure of hoses 47 under pressure and volume variations in certain system components due to temperature changes. However, as will now be apparent, whether or not such motion occurs is, for all practical purposes, immaterial to the accurate operation of our load weighing mechanism.

In using our present invention, the truck 10 need only be driven to the location of the load to be engaged and aligned relative thereto. If the load is on pallets, the truck may be driven forwardly for inserting the forks 30 therebeneath. On the other hand if the load is not arranged on pallets, the load may be transferred to the forks 30 either manually, mechanically, or by forcing the forks under the load. Then the load supporting carriage 18 may be elevated in the mast 16 for raising the load from the ground. It is at this point that the load weighing mechanism of our present invention becomes operative. Thereafter, as long as the load is in an elevated position, the gage 58 will continually register the weight of the load.

To prevent excessive shock and wear on the gage suitable shut-off valves (not shown) may be employed in the fluid lines 47 to render the gage inoperative except when weighing is desired.

After the truck 10 has been driven to the position where the load is to be deposited, the load supporting carriage 18 need only be lowered within the mast 16 until the forks 30 are near the ground. Then the forks may be withdrawn from beneath the pallet or under the load, or the load removed from the forks, as the case may be.

From the foregoing description, it will be seen that we have provided a mechanism which may be incorporated in a conventional fork lift truck for automatically registering the weight of a load being carried by the load supporting means of the truck. In addition the load weighing mechanism is extremely accurate, since the force exerted by the load at each side of the load supporting means is measured and the sum of such forces recorded on a suitable gage. Moreover, trucks embodying our present invention may be manipulated in the same manner as trucks have been in the past. Thus the operators of the improved trucks do not require any special training.

While we have illustrated and described herein a load weighing device which includes two fork frames for supporting the load, it will be readily understood by those skilled in the art that only a single fork or plate may be used if desired. In such a case, of course, it is necessary to use only one lever 40 and fluid pressurizing means 44—46, and a single tube Bourdon tube gage.

Accordingly, it will be understood that various rearrangements and modifications may be made in the embodiment of our present invention which is shown and described herein without departing from the spirit and scope of our present invention.

We claim:

1. For use with an industrial truck having a load supporting carriage, said carriage having a substantially vertical face, load weighing mechanism comprising a load support means, said load support means also having a substantially vertical face, a parallelogram linkage connection joining said vertical faces and supporting said support means from said carriage, whereby said support means is gravitationally acted upon and said vertical face of said support means is horizontally drawn toward said vertical face of said carriage by said linkage connection, pressure responsive means resisting a horizontally directed movement of said support means, and an indicating gage operatively connected to said pressure responsive means.

2. For use with an industrial truck having a load supporting carriage, said carriage having a substantially vertical face, load weighing mechanism comprising a pair of laterally spaced load support members, each of which members also has a substantially vertical face, a parallelogram linkage connection joining the vertical faces of said load support members with said carriage for supporting said support members from said carriage, whereby said load support members are gravitationally acted upon and said vertical faces thereof are horizontally drawn toward said vertical face of said carriage by said linkage connection, pressure responsive means associated with each load support member for resisting horizontally directed movements of said support members, and an indicating gage operably connected to each of said pressure responsive means, said indicating gage being constructed and arranged to additively register loads transmitted thereto from said pair of pressure responsive means.

3. A device as claimed in claim 2 wherein said indicating gage includes a pair of pressure receiving elements arranged to additively register the pressures exerted therein, said pressure receiving elements having individual connections with different ones of said pair of pressure responsive means, whereby said indicating gage responds in proportion to the sum of the forces exerted by a load on said pair of load support members.

4. For use with an industrial truck having a load supporting carriage, load weighing mechanism comprising load support means, depending parallelogram linkage means mounting said load support means to the carriage, a fluid pressure operated weight-indicating gage, fluid pressurizing means, fluid conducting means connecting said fluid pressurizing means with said gage, vertically disposed lever means pivotally mounted to the carriage and operable to effect activation of said fluid pressurizing means, and said lever means being operated by said load support means to generate a fluid pressure in said pressurizing means which is proportional to the weight of a load carried by said load support means.

5. For use with an industrial truck having a load supporting carriage, load weighing mechanism comprising load support means, a parallelogram linkage connecting said load support means to said carriage, a fluid pressure operated weight-indicating gage, a pair of fluid pressurizing means one at each side of the carriage, fluid conducting means connecting each said fluid pressurizing means with said gage, vertically disposed lever means pivotally mounted to the carriage at each side thereof and operable to effect activation of said fluid pressurizing means, each said lever means being operated by said load support means to generate a fluid pressure in one of said pressurizing means proportional to the forces exerted by a load on said load support means at the respective sides thereof, said gage being constructed and arranged to additively register the said latter load forces.

References Cited in the file of this patent

UNITED STATES PATENTS

| | | |
|---|---|---|
| 569,997 | Brown | Oct. 27, 1896 |
| 949,435 | MacDonald | Feb. 15, 1910 |
| 1,606,333 | Averill | Nov. 9, 1926 |
| 1,895,502 | Vernet et al. | Jan. 31, 1933 |
| 1,949,855 | Averill | Mar. 6, 1934 |
| 2,126,377 | Fear et al. | Aug. 9, 1938 |
| 2,358,957 | Barrett | Sept. 26, 1944 |
| 2,613,829 | Gault | Oct. 14, 1952 |
| 2,643,781 | Wise | June 30, 1953 |
| 2,678,207 | Wheeler | May 11, 1954 |
| 2,684,594 | Furcini | July 27, 1954 |